Jan. 31, 1967     D. D. SHAKARIAN     3,301,215
METHOD OF MILKING COWS
Filed Oct. 20, 1964     2 Sheets-Sheet 1
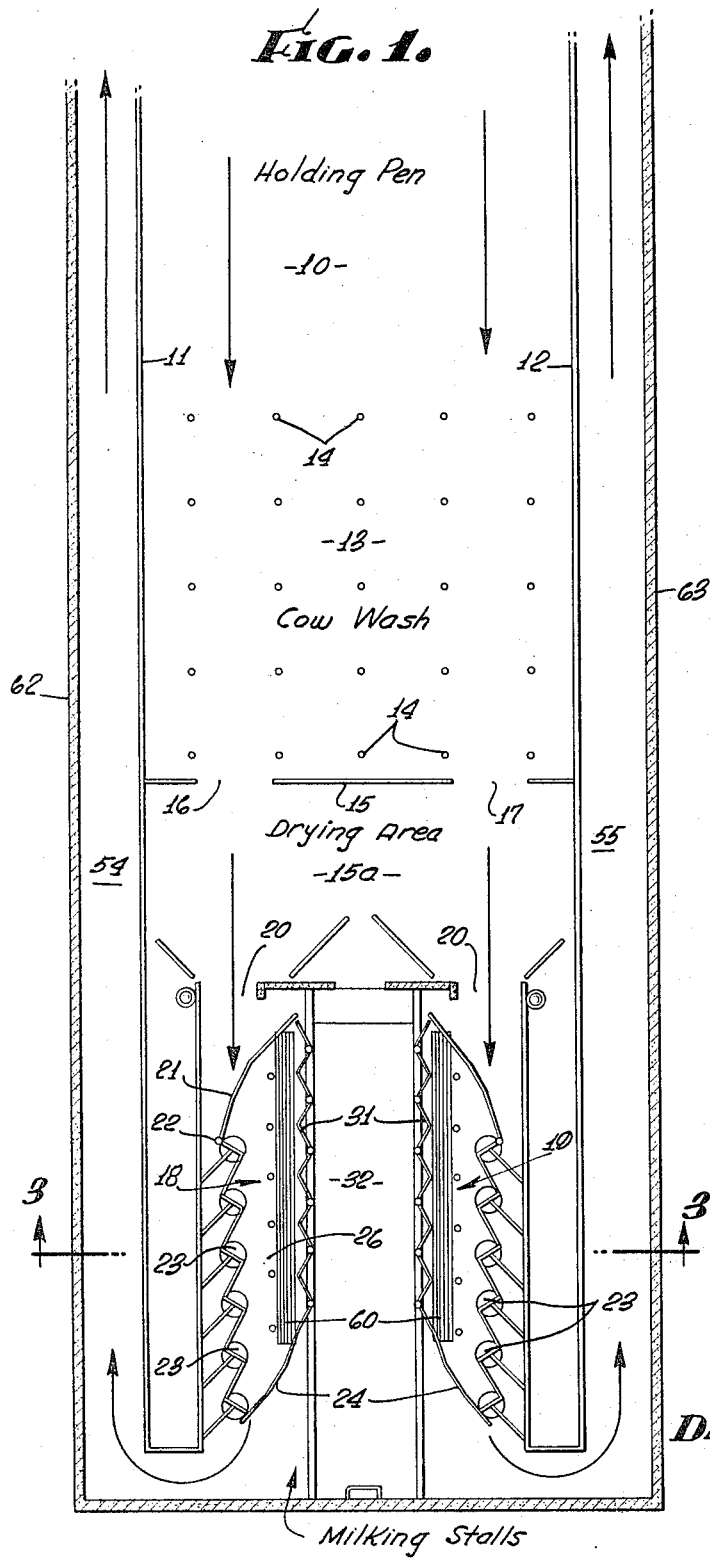
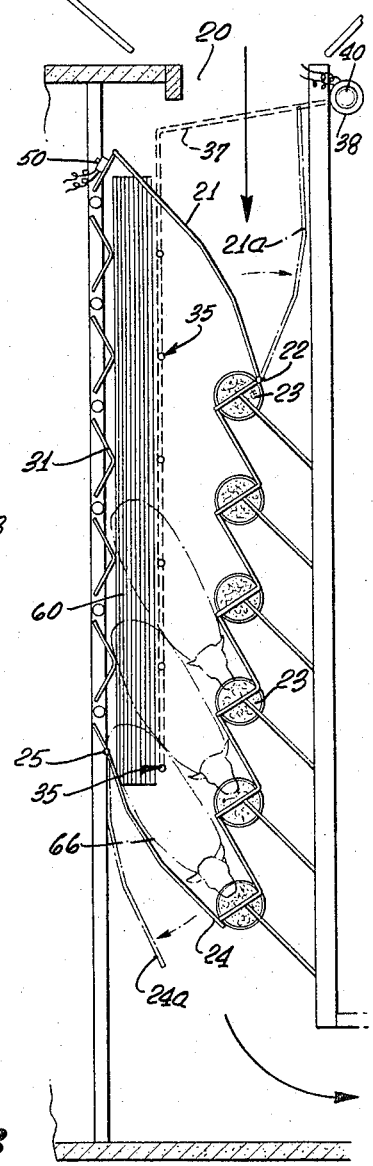
INVENTOR.
*Demos D. Shakarian*
BY *White & Haefliger*
ATTORNEYS.

Jan. 31, 1967   D. D. SHAKARIAN   3,301,215
METHOD OF MILKING COWS
Filed Oct. 20, 1964   2 Sheets-Sheet 2
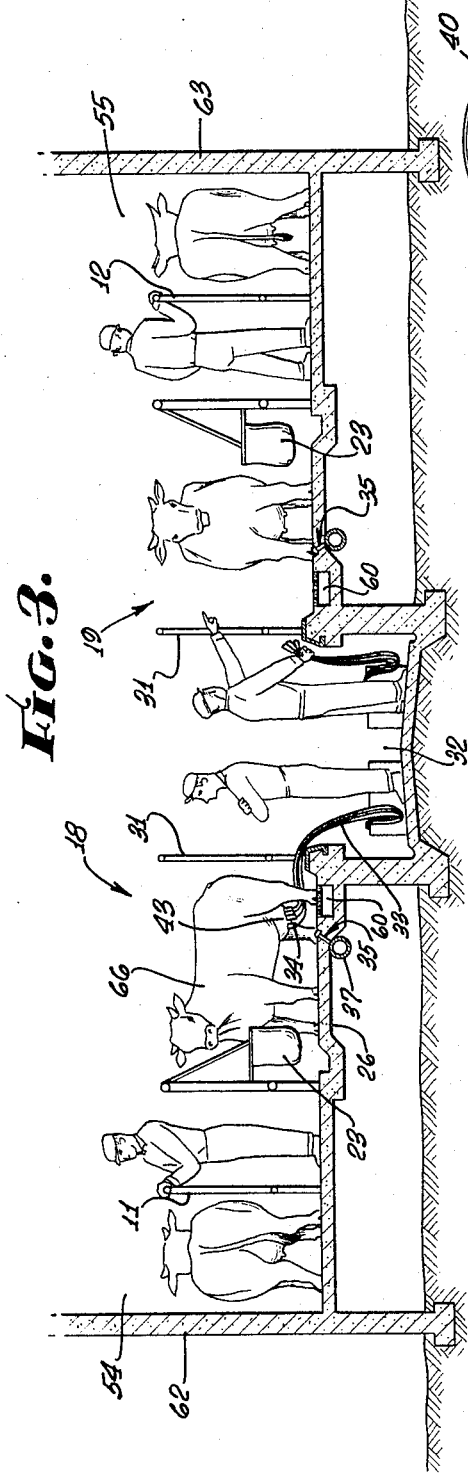
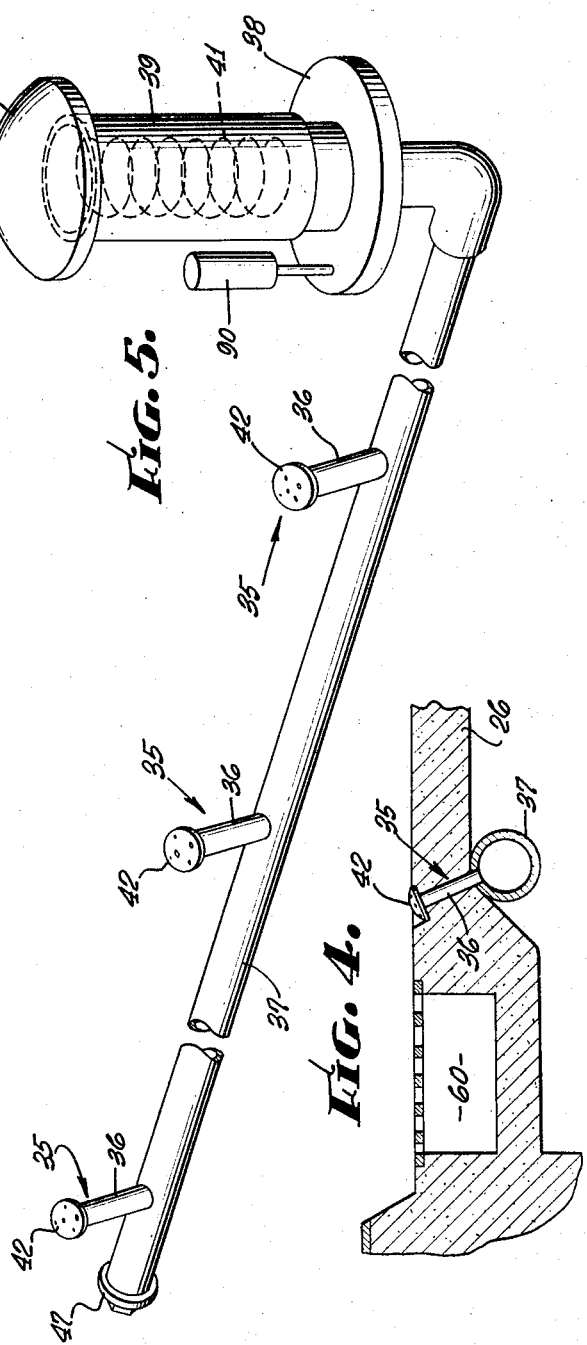
INVENTOR.
DEMOS D. SHAKARIAN
BY White & Haefliger
ATTORNEYS.

United States Patent Office 3,301,215
Patented Jan. 31, 1967

3,301,215
METHOD OF MILKING COWS
Demos D. Shakarian, 8413 Lexington Road,
Downey, Calif. 90241
Filed Oct. 20, 1964, Ser. No. 405,075
4 Claims. (Cl. 119—14.02)

This invention relates generally to dairy treatment of cows, and more specifically concerns improvements in milking procedures, including stimulation, drying and cleaning of the udder.

While the use of automatic milking equipment in dairies speeds up the time required for milking large herds of cows, there is a need for increasing the efficiency of the milking process as regards assuring removal of all available milk from the udder. Dairymen report that should the cow not be ready to "let down" the milk, the quantity of milk removable is significantly less than that potentially available, despite the use of automatic milking equipment.

The present invention has as its major object the fulfilling of the long standing need for assuring rapid conditioning of the cow to let down the milk just prior to the time of milking when using automatic equipment. Basically, it has been found that the cow udder may be conditioned for milking by jetting a warm gaseous stream to flow in contact with the udder immediately prior to application thereto of the automatic milking cups and suction lines.

As applied to the processing of a herd, the invention contemplates the steps of running groups of cows into a milking stall in group sequence so that the cows stand side by side therein in a row, simultaneously conditioning the cow udders for milking by jetting warm air streams at the udders, and then simultaneously milking the udders. Prior to passage of each group into the milking stall, the cows may be subjected to cleaning as by jetting water streams at the udders, and any detrimental effect of such washing upon the milk giving propensities of the cow is overcome by the warm air treatment in the milking stall.

In its apparatus aspects, the invention contemplates the provision of a stall for receiving a cow to be milked and for confining the cow to stand in predetermined position, together with means typically including a jet nozzle directed for jetting a warm gaseous stream to flow in contact with the cow udder conditioning same for milking. For best results, the air stream jetting should be continued for a time interval of between 30 and 60 seconds, at stream temperatures of about 100° F., and at flow rates of between 450 and 550 cubic feet per minute. As will appear, a series of jet nozzles is typically located to correspond to the spacing of cows confined, in the milking stall, each nozzle being directed upwardly from beneath a cow. Also, the nozzles are supplied from a header to which a blower discharges air, an electric heater operating to warm the air stream.

These and other objects and advantages of the invention, as well as the details of illustrative embodiments, will be more fully understood from the following detailed description of the drawings in which:

FIG. 1 is an overall plan view showing the dairy area in which the apparatus and method of the invention are employed;

FIG. 2 is an enlarged plan view showing of the milking stall;

FIG. 3 is an enlarged elevation taken in section on line 3—3 of FIG. 1;

FIG. 4 is an enlarged section showing a warm air jetting nozzle; and

FIG. 5 is a perspective illustration of means for supplying warm air to a series of warm air jetting nozzles.

Referring first to FIG. 1, a pen 10 is formed between parallel walls 11 and 12 for holding cows moving toward the washing area or stall 13. In the latter, which is also formed between walls 11 and 12, means is provided for thoroughly washing the cow udders, such means typically taking the form of water jets 14 directed upward from the floor of the washing stall.

Beyond a partition 15 at the end of the stall 13 is a drying area 15a to which cows are passed via the openings 16 and 17, and beyond the drying area are two milking stalls generally indicated at 18 and 19. In this regard, while two groups of cows are temporarily confined in the milking stalls, other groups of cows are being washed in stall 13 and are drying at 15a in preparation for milking.

As seen in FIGS. 1 and 2, each of the milking stalls includes an inlet 20, an entrance gate 21 pivoted at 22, a zig-zag rail 31 at one side of the stall, feed containers 23 at the opposite side of the stall, and an exit gate 24 pivoted at 25. These elements are so arranged that cows entering past open gate 21 line up in a row in herringbone fashion for close confinement when gate 21 is closed. The solid line positions of the gate 21 and 24 indicate their closed condition, whereas the broken lines 21a and 24a show the open position of these gates. The concrete floor 26 of the milking stall is seen in FIG. 3 to contain grill covered manure trough 60 running lengthwise at the foot of the adjacent rail 31. Intermediate the two parallel milking stalls is a working space or area 32 wherein dairymen may operate milking equipment including suction lines 33 and cups 34.

In accordance with the invention, the cow udders are conditioned for milking by jetting warm gaseous streams to flow in contact with the udders just prior to milking. This may be accomplished by providing means including two series of jet nozzles 35 directed upwardly from the stall floor 26, one series for each row of cows in the two milking stalls. Each nozzle includes a stem 36 connected to a header 37 running beneath the concrete floor 26 and supplied with warm air by means of a remote blower unit 38 taking suction from an air intake riser 39. Air enters the riser under dome 40, passes downwardly past a thermostatically controlled electrical heater coil 41, then through the blower unit to header 37 and to the nozzles. When jetted through the nozzle perforated caps 42, the warmed air passes in contact with the cow udders 43 for sufficient time as to condition them for maximum milk delivery to the suction equipment applied immediately after the warm air treatment. Other functions and purposes of the warm air jetting include stimulating or priming as well as drying of the udder, the latter promoting sanitation, since there is less resulting danger of spreading mastitis or other disease bearing organisms among the herd. Also, disinfectant and lubricating oil may be drip-dispensed to the air stream, as from a dispenser 90, for disinfecting and lubricating the mammary system against chapping.

In a typical installation, the blower delivers between 450 and 550 cubic feet of air per minute to each nozzle for a time interval of between 30 and 60 seconds, and at an air temperature of between 95° F. to 110° F. This simultaneous treatment of all cows 66 results in near optimum delivery of milk from the cow udders and reduces the milking time required. Typically, the header 37 will have a diameter of about 12 inches and the nozzle stem 36 will have 3-inch diameter. A plug 47 is removable from the end 48 of the header to facilitate periodic clean out of the header. The blower and heater may be remotely controlled, as from a switch 50 installed near entrance gate 21 to be actuated when that gate is closed upon the row of cows ready to be treated and milked.

Immediately after warm air conditioning, the milking equipment is applied and milking is completed. Thereafter, the milking equipment is removed from the udders and the cows are removed past the then open exit gate 24. Parallel runways are provided at 54 and 55 to return the cows to the barn exterior, there being parallel walls 62 and 63 spaced from walls 11 and 12 to define these runways.

I claim:

1. In dairy treatment of cows, the steps that include confining a first group of cows in a washing stall, jetting water streams at the cow udders for cleaning same, thereafter removing the first group of cows from the washing stall and confining that group in a drying area followed by removal of that cow group from the drying area, and thereafter confining said first group of cows in a milking stall to stand side by side in a row, conditioning the cow udders for milking by jetting warm air streams at said udders while the cows remain standing in the milking stall, and then milking said udders.

2. The method of claim 1 including the step of continuing to jet the air stream at a cow udder for a time interval of between 30 and 60 seconds, and controlling the air stream temperature at between 95° F. and 110° F.

3. The method of claim 1 including the further steps of confining a second group of cows in said washing stall for washing the cow udders while the first group of cows is confined in said milking stall, and thereafter removing the first group of cows from said milking stall after completion of milking and introducing the second group of cows to the milking stall for warm air treatment and milking therein.

4. In dairy treatment of cows, the steps that include
 (a) herding the cows into an udder washing area,
 (b) confining the cows in said washing area for a suitable washing period,
 (c) removing the cows from said washing area and confining them in a drying area,
 (d) removing the cows from the drying area and confining the cows in a stall area,
 (e) conditioning the cows udders by warming them by means of jet air impinging thereon,
 (f) and then milking the udders.

References Cited by the Examiner
UNITED STATES PATENTS

| | | | |
|---|---|---|---|
| 883,132 | 3/1908 | Goff | 119—159 |
| 1,511,450 | 10/1924 | Findlay | 119—156 |
| 1,787,152 | 12/1930 | Hapgood | 119—14.04 |
| 1,968,564 | 7/1934 | Luks | 119—14.04 |
| 2,264,201 | 11/1941 | Findlay | 119—159 |
| 2,358,000 | 9/1944 | Cornell | 119—14.04 |
| 2,969,039 | 1/1961 | Golay | 119—14.03 |
| 3,223,070 | 12/1965 | Gribble et al. | 119—16 |

SAMUEL KOREN, *Primary Examiner.*

ALDRICH MEDBERY, *Examiner.*